United States Patent [19]

DeBaryshe et al.

[11] 4,287,421

[45] Sep. 1, 1981

[54] COMPENSATION OF THERMAL EXPANSION IN MIRRORS FOR HIGH POWER RADIATION BEAMS

[75] Inventors: Paul G. DeBaryshe, Lincoln; Sheldon L. Glickler, Natick, both of Mass.

[73] Assignee: Jersey Nuclear-Avco Isotopes, Inc., Bellevue, Wash.

[21] Appl. No.: 913,317

[22] Filed: Jun. 7, 1978

[51] Int. Cl.³ .......................... G02B 5/08; H01J 27/00
[52] U.S. Cl. ............................... 250/423 P; 350/310; 350/166
[58] Field of Search ..................... 331/94.5 C, 94.5 D; 250/423 P; 350/288, 310, 166

[56] References Cited

U.S. PATENT DOCUMENTS

| | | | |
|---|---|---|---|
| 3,609,589 | 9/1971 | Hufnagel | 331/94.5 D |
| 4,147,409 | 4/1979 | Apfel | 331/94.5 C X |

*Primary Examiner*—F. L. Evans
*Attorney, Agent, or Firm*—Weingarten, Schurgin & Gagnebin

[57] ABSTRACT

A mirror for reflecting the high power radiation of laser beams while maintaining the predetermined shape of the reflecting surface. Radiation is reflected by a front, typically dielectric, surface on a transparent substrate. Since some power is unavoidably absorbed at the reflecting surface, the mirror will experience a thermal expansion. Some incident radiation is also transmitted to the opposite side of the substrate where at least a portion of the transmitted radiation is absorbed to a degree preselected to provide thermal expansion of that opposite side complementary to the expansion of the reflecting surface. The two expansions can be adjusted such that the shape of the reflecting surface is affected far less by the incident radiation than in the case where no opposite side absorption is provided.

13 Claims, 1 Drawing Figure

COMPENSATION OF THERMAL EXPANSION IN MIRRORS FOR HIGH POWER RADIATION BEAMS

FIELD OF THE INVENTION

The present invention relates to mirrors and in particular mirrors with low thermal bending for reflecting high power radiation beams.

BACKGROUND OF THE INVENTION

In laser isotope separation, in particular uranium enrichment on a plant scale, it is required that laser beams of hundreds of watts of power be directed over substantial distances such as thousands of meters. It is essential that the beams be long in order to insure that the useful energy within the laser beams is efficiently utilized in photoexciting or ionizing particles of a selected isotope type. At the same time, the dimensions of the channels down which the laser beams must pass are not much bigger than the beam cross-section itself. It is additionally desired that the beam be centered in the channel and not be deflected to graze or strike the channel walls. Apparatus of the sort with which such laser beams may be employed are illustrated in U.S. Pat. Nos. 3,772,519, and 3,939,354, incorporated herein by reference and commonly assigned.

Because the beams utilized in laser enrichment are typically composite beams of several colors, as well as the result of the interleaving of pulsed radiation from many pulsed laser sources, as for example illustrated in U.S. Pat. No. 3,944,947, and further because the radiation is likely to be applied through a succession of channels, it is anticipated that a number of reflecting surfaces will be required for transporting the beams from the source of generation throughout the utilization channels, as well as for aligning and redirecting the beams. Because of the power densities employed in the laser beams some radiation absorption is inevitable at the reflecting surfaces even with the most carefully prepared reflectors. As a result of such radiation absorption, the reflecting surfaces of the mirrors will increase in temperature producing a thermal expansion at the reflecting surface which, by analogy to the bimetallic strip, will result in a bending of the mirror and in particular of the reflecting surface. Such a bending produces not only an undesired shift in the beam direction over the distances of beam propagation required, but in addition produces aberations detrimental of the beam wavefront which results in defocusing and diverging effects. These may be difficult or impossible to correct.

While it has been proposed, as in U.S. Pat. No. 3,609,589 to provide a mirror of layered metallic composition wherein each layer spaced back from the reflecting surface has an increased thermal coefficient of expansion to compensate for the lower thermal heating of the reflector with distance from the reflecting surface, such layers are unsatisfactory. For a first reason, reflection by a metallic reflector is less efficient than by a layer or layers of dielectric films. In addition, the relative slowness of thermal conductivity throughout the mirror substrate prevents such a device from being effective in compensating for thermal distortions of the mirror surface on all but the most long-term basis under steady state illumination conditions. Also, the required precision to which such a mirror must be manufactured such that each layer has a precisely dimensioned thermal expansion, makes it economically impractical. Finally, absorption by a thick front face metallic reflector tends to be higher than absorption by a properly designed dielectric mirror, thus limiting total power handling capability.

BRIEF SUMMARY OF THE INVENTION

In accordance with the teaching of the present invention, a mirror for reflecting high power laser beams is provided in which a transparent substrate has on a first reflecting surface a multi-dielectric layer, preferably adapted to provide optimum reflection of the color or colors of radiation in the laser beam. Inherent in any such surface, however, is the absorption of a portion of the radiation resulting in the heating of the reflecting surface and expansion of the underlying substrate. The reflecting surface is also provided with a characteristic that results in transmission of a portion of the incident laser radiation, apart from that portion which is typically scattered. This radiation is permitted to pass through the substrate to a rear or opposite surface which has an absorbing layer that, in most applications, may be nearly or completely absorbing, this rear layer acts to heat the rear surface of the mirror also producing a thermal expansion complementary to that of the expansion of the front surface. By proper adjusting of the reflecting and rear absorbing surfaces, the compensation can be quite complete. The mirror which results from such a structure is then greatly superior in its beam maintaining characteristics than the mirror without the expansion compensation.

Because the compensating mirror of the present invention operates directly upon the radiation by absorption of it, it is effective over a wide range of beam powers. Moreover, because the radiation is directly absorbed from the beam itself, and does not have to heat by thermal conduction, the compensation effect is just as instantaneous as is the original thermal expansion creating the mirror deflection. Also because the mirror of the present invention absorbs more nearly equal amounts of thermal radiation at both the front reflecting and rear absorbing surfaces, any long-term thermal gradient is largely eliminated.

BRIEF DESCRIPTION OF THE DRAWING

These and other features of the present invention are more fully set forth below in the detailed description, presented solely for purposes of illustration and not by way of limitation and in the accompanying drawing of which.

DETAILED DESCRIPTION OF THE INVENTION

Figure 1:
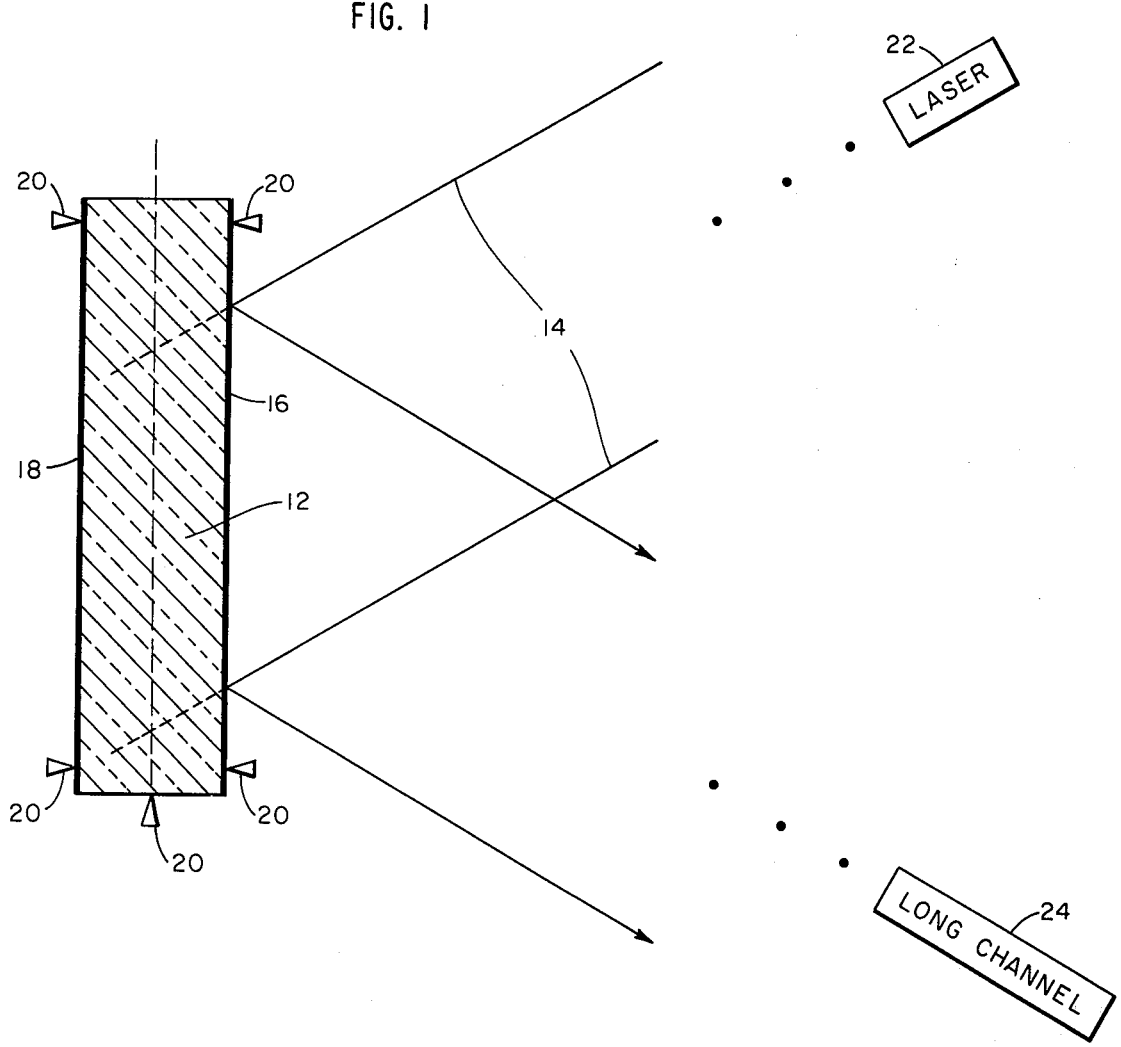
FIG. 1 is an illustration of the mirror according to the present invention operative in reflecting a beam of laser radiation.

The present invention contemplates a mirror for redirecting high energy laser beams and having a front reflecting surface partially absorptive to radiation in the incident beam and a rear absorbing surface separated by a transparent substrate which permits a portion of the incident radiation to be transmitted to the mirror rear surface for absorption there.

Where high energy laser beams are propagated over substantial distances it is often desired that mirrors be employed to reflect the beam for purposes of alignment and repositioning of the beam. Thermal energy of significant proportions can be absorbed by the mirrors resulting in their thermal deformation. While it is known to provide reflection of laser radiation by either metallic conducting surfaces or by tuned dielectric layers, in state of the art reflector designs, the reflectivity of dielectric layers is generally superior, reflecting a greater proportion of the incident radiation and absorbing or otherwise scattering a lesser proportion of that radiation.

Reflective dielectric layers are well known in the art and can be provided according to known formulate to reflect a frequency or frequencies nearly completely as the result of wave cancellation phenomenon from each of the interfaces between layers of different dielectric or refractive index.

In applications of laser enrichment where isotopically selective photoexcitation and ionization is desired, the frequencies of radiation in the beams propagated throughout the system for this purpose are typically of very high spectral purity in order to accomplish the selectivity of excitation. While there thus may be three or four colors in a single beam of laser radiation for the different energies of excitation desired, it is nonetheless possible to provide highly efficient high reflectivity surfaces composed of multiple dielectric layers tuned to reflect at those frequencies.

Whereas the reflectivity is indeed very good, approaching 100%, there is nevertheless a portion of the radiation, for example 0.2% in good quality reflectors, which is not reflected. Of this radiation, a portion is typically absorbed at the reflecting surface resulting in the heating of that portion of the reflective element and thermal expansion tending to create a distorted convex surface. Other portions of the nonreflected radiation are typically scattered and transmitted.

In accordance with the present invention, that portion of the radiation which passes through the reflective layers without reflection is utilized to provide thermally induced rear surface expansion, compensating for the front surface expansion. For this purpose, the reflective dielectric layers are deposited upon a transparent substrate which is typically optical grade quartz such as the substrate 12 illustrated in FIG. 1, a portion of the radiation in an incident beam 14, which is not reflected or absorbed at a multilayer dielectric reflecting surface 16, passes through the substrate 12 to a rear absorbing layer 18.

In the case where the portion of the radiation transmitted through the substrate 12 by the layer 16 is at least as great as the portion of the radiation which is absorbed at the reflecting layer 16, absorption of all or part of that radiation by the rear layer 18 will provide thermal heating at the rear of the substrate 12 equivalent to the thermal heating at the front. In this manner, the thermal expansion of the homogeneous substrate 12 can be made the same at both the front, near the reflecting surface 16, and at the rear, near the absorbing surface 18. In addition, long-term thermal equilibrium for the substrate 12 will be provided with no gradient between the front surface 16 and the rear surface 18 thereby avoiding the difficulties of maintaining a proper gradient and conditions of expansion appropriate to it.

The technique for providing appropriate multi-dielectric layers for surface 16 is well known in the art as, for example, presented in "Military Standardization Handbook," No. 141, *Optical Design*. Using such techniques and for a given frequency or frequencies, a selection of appropriate layers and their order can be made. Fabrication of such layers is a common industry technique. For the absorbing layer 18, where it is desired to absorb all or nearly all of the radiation transmitted through the substrate 12, a fully absorbing material may be utilized. These may be optically thick dielectric layers absorbing in the spectral region of the applied radiation, or a combination of such layers with thin dielectric or thin dielectric and metallic layers. In typical fabrication, the substrate 12 will be dimensioned approximately one-fourth to one-sixth its diameter in thickness, and for precise mounting is typically set between knife edges such as the knife edges 20 illustrated in FIG. 1.

It is additionally contemplated to adjust the absorption of the layer 18 positionally where desired to vary the degree of heating at different locations in the reflector. For example, the substrate 12 edges may lose heat more rapidly than the center due to the greater surface area and it may be desired to generate more heat in edge regions by thickening the absorbing layer 18 or otherwise providing for higher absorption there.

As thus described, a mirror is presented useful for redirecting and aligning radiation in a beam 14 such as from a laser source or sources 22 for application to one or more channels 24 where isotopically selective photoexcitation and ionization takes place in accordance with the teaching of the above-referenced United States patents.

The specific teaching of the invention is intended as exemplary only and not as a limitation on the scope of the invention other than as specifically provided in the following claims.

What is claimed is:

1. A multilayer front reflecting mirror for reflecting electromagnetic radiation provided in a beam from a source of radiation and with the mirror compensated for thermal expansion caused by absorption of incident radiation, said mirror comprising:
    a substrate transmissive to the electromagnetic radiation in said beam and having first and second surfaces with said first surface receiving said beam;
    a coating on said first surface of said substrate operative to reflect the majority of the radiation in said output beam, absorb a small portion of the incident radiation to produce a thermal change in size along said first surface and to transmit to said second surface a further small portion of the radiation in said beam;
    a coating on said second surface of said substrate operating to absorb at least a portion of the radiation transmitted from said first surface to said second surface;
    to produce a thermal change in size along said second surface compensatory to the change in size along said first surface.

2. The mirror of claim 1 wherein:
    said first surface has a predetermined shape;
    the radiation absorbed by the coatings of said first and second surfaces produces thermal expansion at the first and second surfaces of said substrate; and
    the coating of said second surface is adapted to absorb radiation to a degree to cause a thermal expansion of said second surface so as to maintain said predetermined shape.

3. A multilayer front reflecting mirror compensated for thermal expansion caused by absorption of incident radiation comprising:
    an optically transmissive substrate having first and second surfaces;

a source of radiant energy in the optical frequency range to which said substrate is transmissive and providing an output beam of radiation of said radiant energy;

said output beam being directed toward said first surface;

a coating on said first surface of said substrate operative to reflect the majority of the radiant energy in said output beam to absorb a small portion of the incident radiation to produce a thermal change in size along said first surface and to transmit to said second surface a small portion of the radiant energy in said output beam;

a coating on said second surface of said substrate operating to absorb a portion of the radiant energy transmitted from said first surface to said second surface to produce a thermal change in size along said second surface compensatory to the change is size along said first surface.

4. The mirror of claim 3 wherein said coating on said second surface is selected from absorbing dielectric and metal layers or combinations thereof.

5. The mirror of claim 3 wherein the material of said substrate includes optical grade quartz.

6. The mirror of claim 3 wherein said coating on said first surface includes at least one dielectric layer.

7. The mirror of claim 3 wherein said substrate has a diameter transverse to a thick dimension between said first and second surfaces and in which its thickness is approximately one-sixth to one-fourth its diameter.

8. The mirror of claim 3 wherein said source of radiant energy provides a plurality of frequencies of radiant energy.

9. The mirror of claim 3 wherein said second surface coating is adapted to absorb transmitted radiant energy to differing degrees on different areas of said second surface coating.

10. The mirror of claim 9 wherein the coating on said second surface is provided to generate heat more at peripheral portions of said substrate than at central portions.

11. A photoexcitation system comprising:

an optically transmissive substrate having first and second surfaces;

a source of radiant energy in the optical frequency range to which said substrate is transmissive and providing an output beam or radiation of said radiant energy;

said output beam being directed toward said first surface;

a coating on said first surface of said substrate operative to reflect the majority of the radiant energy in said output beam to absorb a small portion of the incident radiation to produce a thermal change in size along said first surface and to transmit to said second surface a small portion of the radiant energy in said output beam;

a coating on said second surface of said substrate operating to absorb a portion of the radiant energy transmitted from said first surface to said second surface to produce a thermal change in size along said second surface compensatory to the change is size along said first surface;

said source of radiant energy including means for providing radiant energy of one or more frequencies in which at least one frequency is selected for producing isotopically selective photoexcitation of a material; and means responsive to radiant energy reflected by said coating on said first surface for producing isotopically selective photoexcitation in response thereto.

12. A photoexcitation system according to claim 11 further including:

means for generating the vapor of said material to which the radiant energy reflected by said coating on said first surface is applied to produce isotopically selective photoexcitation.

13. A photoexcitation system according to claim 12 wherein said predetermined material includes uranium and the radiation is tuned for isotopically selective photoexcitation of the U-235 isotope thereof.

* * * * *